United States Patent
Scholz et al.

(10) Patent No.: US 11,030,668 B2
(45) Date of Patent: *Jun. 8, 2021

(54) SYSTEM AND METHOD FOR MAKING A RECOMMENDATION BASED ON USER DATA

(71) Applicant: MICRO FOCUS LLC, Santa Clara, CA (US)

(72) Inventors: Martin B. Scholz, San Francisco, CA (US); Rajan Lukose, Oakland, CA (US); Rong Pan, Mountain View, CA (US)

(73) Assignee: Micro Focus LLC, Santa Clara, CA (US)

(*) Notice: Subject to any disclaimer, the term of this patent is extended or adjusted under 35 U.S.C. 154(b) by 1006 days.

This patent is subject to a terminal disclaimer.

(21) Appl. No.: 15/463,623

(22) Filed: Mar. 20, 2017

(65) Prior Publication Data

US 2017/0193589 A1    Jul. 6, 2017

Related U.S. Application Data

(63) Continuation of application No. 12/430,411, filed on Apr. 27, 2009, now Pat. No. 9,633,117.

(51) Int. Cl.
*G06Q 30/06* (2012.01)
*G06F 16/23* (2019.01)
(Continued)

(52) U.S. Cl.
CPC ......... *G06Q 30/0631* (2013.01); *G06F 16/23* (2019.01); *G06F 16/95* (2019.01);
(Continued)

(58) Field of Classification Search
CPC .................. G06F 16/9535; G06Q 30/0631
See application file for complete search history.

(56) References Cited

U.S. PATENT DOCUMENTS

| | | |
|---|---|---|
| 6,839,680 B1 | 1/2005 | Liu et al. |
| 6,915,284 B2 | 7/2005 | Adar et al. |

(Continued)

OTHER PUBLICATIONS

Melville et al., "Content-Boosted Collaborative Filtering for Improved Recommendations". Proceedings of the 18th National Conference on Artificial Intelligence. Edmonton, Canada, Jul. 2002., pp. 187-192.

(Continued)

*Primary Examiner* — Charles E Lu

(57) ABSTRACT

There is described a system and computer-implemented method for providing a recommendation based on a sparse pattern of data. An exemplary method comprises determining a likelihood that an item for which no user preference data is available will be preferred. The exemplary method also comprises determining a likelihood that an item for which user preference data is available for users other than a particular user will be preferred based on the likelihood that the item for which no user preference data is available will be preferred. The exemplary method additionally comprises predicting that an item for which no user preference data relative to the particular user is available will be preferred if the likelihood that the particular user will prefer the item exceeds a certain level.

20 Claims, 6 Drawing Sheets

(51) Int. Cl.
*G06F 16/95* (2019.01)
*G06F 16/9535* (2019.01)
*H04L 29/08* (2006.01)

(52) U.S. Cl.
CPC ........ *G06F 16/9535* (2019.01); *H04L 67/025* (2013.01); *H04L 67/22* (2013.01)

(56) References Cited

U.S. PATENT DOCUMENTS

| | | | |
|---|---|---|---|
| 7,246,121 B2 | 7/2007 | Adar et al. | |
| 7,389,290 B2 | 6/2008 | Adar et al. | |
| 8,001,132 B2 | 8/2011 | Koren et al. | |
| 8,117,197 B1* | 2/2012 | Cramer | G06F 16/248 |
| | | | 707/731 |
| 8,386,485 B2* | 2/2013 | Kerschberg | G06F 16/90324 |
| | | | 707/736 |
| 8,392,245 B1* | 3/2013 | Crawford, Jr. | H04L 67/32 |
| | | | 705/14.16 |
| 2002/0052873 A1 | 5/2002 | Delgado et al. | |
| 2002/0083060 A1 | 6/2002 | Wang et al. | |
| 2002/0165812 A1 | 11/2002 | Lukose | |
| 2003/0088871 A1 | 5/2003 | Kimura | |
| 2003/0101449 A1 | 5/2003 | Bentolila et al. | |
| 2003/0105682 A1 | 6/2003 | Dicker et al. | |
| 2003/0172067 A1 | 9/2003 | Adar et al. | |
| 2003/0200190 A1 | 10/2003 | Adar et al. | |
| 2003/0204581 A1 | 10/2003 | Adar et al. | |
| 2003/0204604 A1 | 10/2003 | Adar et al. | |
| 2003/0217106 A1 | 11/2003 | Adar et al. | |
| 2004/0024718 A1 | 2/2004 | Adar et al. | |
| 2004/0024719 A1 | 2/2004 | Adar et al. | |
| 2004/0068499 A1 | 4/2004 | Adar et al. | |
| 2004/0148245 A1 | 7/2004 | Chen et al. | |
| 2004/0158497 A1 | 8/2004 | Brand | |
| 2005/0038698 A1 | 2/2005 | Lukose et al. | |
| 2005/0038699 A1 | 2/2005 | Lillibridge et al. | |
| 2005/0038774 A1 | 2/2005 | Lillibridge et al. | |
| 2005/0071753 A1 | 3/2005 | Klein et al. | |
| 2005/0071784 A1 | 3/2005 | Klein et al. | |
| 2005/0086201 A1 | 4/2005 | Weddeling et al. | |
| 2005/0102632 A1 | 5/2005 | Klinger et al. | |
| 2005/0108333 A1 | 5/2005 | Scholz et al. | |
| 2005/0171975 A1 | 8/2005 | Scholz | |
| 2005/0246721 A1 | 11/2005 | Scholz | |
| 2005/0278652 A1 | 12/2005 | Scholz | |
| 2005/0278653 A1 | 12/2005 | Scholz | |
| 2006/0041472 A1 | 2/2006 | Lukose et al. | |
| 2006/0041548 A1* | 2/2006 | Parsons | G06F 16/954 |
| 2006/0069663 A1 | 3/2006 | Adar et al. | |
| 2006/0195468 A1 | 8/2006 | Yanagi et al. | |
| 2007/0081454 A1 | 4/2007 | Bergamasco et al. | |
| 2007/0091802 A1 | 4/2007 | Pan et al. | |
| 2007/0094259 A1* | 4/2007 | Shi | H04N 21/4662 |
| 2007/0248005 A1 | 10/2007 | Pan et al. | |
| 2008/0126176 A1 | 5/2008 | Iguchi | |
| 2009/0030934 A1 | 1/2009 | Behrens | |
| 2009/0030938 A1 | 1/2009 | Behrens et al. | |
| 2009/0031112 A1 | 1/2009 | Behrens et al. | |
| 2009/0037317 A1 | 2/2009 | Zhou et al. | |
| 2009/0113069 A1 | 4/2009 | Prabhakar et al. | |
| 2009/0113390 A1 | 4/2009 | Scholz et al. | |
| 2009/0144335 A1 | 6/2009 | Scholz | |
| 2009/0164987 A1 | 6/2009 | Scholz et al. | |
| 2009/0172572 A1 | 7/2009 | Behrens et al. | |
| 2009/0172601 A1 | 7/2009 | Behrens et al. | |
| 2009/0172645 A1 | 7/2009 | Behrens et al. | |
| 2009/0299996 A1* | 12/2009 | Yu | G06F 16/9535 |
| 2010/0058210 A1* | 3/2010 | Johnson | G06Q 30/02 |
| | | | 715/764 |
| 2010/0169340 A1* | 7/2010 | Kenedy | G06Q 30/02 |
| | | | 707/758 |

OTHER PUBLICATIONS

Schein et al., "Generative Models for ColdStart Recommendation". Proceedings of the SIGIR-2001 Workshop on Recommender Systems. 2001. Retrieved Aug. 1, 2012 from http://www.cis.upenn.edu/~poescul/Publications/schein01generative.pdf.

Fenstermacher et al., "Mining Client-Side Activity for Personalization". Department of Management Information Systems Eller College of Business and Public Administration, University of Arizona, Jun. 2002.

Baoyao, Z., "Intelligent Web Usage Mining", Nanyang Technological University, Division of Information Systems, School of Computer Engineering, 2004.

Baynote Inc., "Collective Intelligence Platform", Online <http://baynote.com/technology/platform/> 2010.

Hottolink Inc., "What is 'Reconize'?" Online <http://hottolink.co.jp/english/recognize.html, 2009.

Andrejko, Anton et al., "User Characteristics Acquisition from Logs with Semantics" Institute of Informatics and Software Engineering, Slovak University of Technology in Bratislava, Slovakia.

Lu, Hongjun et al., "Extending a Web Browser with Client-Side Mining", Hong Kong University of Science and Technology, Department of Computer Science, Clear Water Bay, Kowloon, Hong Kong, China, 2003.

Shankar et al., "Personalized Web Search Based on Client Side Technology", CS 498: B. Tech Project, 10, IIT Kanpur India 2010.

Sendikumar et al., "Personalized ontology for web search personalization" Compute 2008, Jan. 18-20, 2008, Anna University, Chennai, India.

Shahabi et al., "Yoda: An Accurate and Scalable Web-Based Recommendation System", University of Southern California, Los Angeles, in the Proceedings of the Sixth International Conference on Cooperative Information Systems, Trento, Italy. Sep. 2001.

Why Wubat? Website User Behavior & Analysis Tool, Wubat, online <http://www.wubat.com/, 2008.

Claypool et al., "Implicit Interest Indicators". 14. Worcester Polytechnic Institute, Computer Science Department, Worcester, MA, 2001.

Shahabi et al., "A Framework for Efficient and Anonymous Web Usage Mining Based on Client-Side Tracking.", University of Souther California, Los Angeles, 2002.

Chattertrap, online <http://chattertrap.com/> accessed Jul. 2, 2010.

Homeland Security Newswire: "SRI Defense Technology Spawns Civilian Application", Jun. 29, 2010.

Ha, Anthony, "Facebook Investor backs Chattertrap, a personal assistant for content", Venturebeat.com, Jun. 28, 2010.

Pan, R. et al., "One-Class Collaborative Filtering", 2008. ICDM '08, 8th IEEE International Conference on Data Mining. Dec. 15-19, 2008, pp. 502-511.

* cited by examiner

100

300

SYSTEM AND METHOD FOR MAKING A RECOMMENDATION BASED ON USER DATA

BACKGROUND

One-class collaborative filtering is a problem that naturally occurs in many different settings. One such setting is with regard to the analysis of clickstream data, which refers to a list of links on which a particular user has clicked. Clickstream data, for example, only contains information identifying which websites were visited by a user during a given period of observation. Moreover, clickstream data does not provide any indication of why a user did not visit sites that were not visited. It could be, because the user does not like a particular site, or because the user did not know about the site, or that the site was visited outside the period of observation, to name just a few examples. There is no accounting for any of these reasons in clickstream data. In addition, clickstream data tends to be sparse. As used herein, the terms "sparse" or "sparsity" refer to a set of data sets in which a number of unobserved items greatly exceeds a number of observed items.

In certain circumstances, it may be desirable to predict a user's interests based on clickstream data or other sparse data. Sparse data regarding items purchased by a user may be used to predict other items the user might prefer from a larger data set, without any explicit ratings or other background information. In addition, sparse data regarding which software modules a user has already installed may be used to predict additional modules the user might prefer, without any explicit feedback about those modules from the user. Effective prediction of user interest allows a provider to deliver content the user is more likely to enjoy or prefer, such as personalized news, advertisements or the like. In making such predictions, it is desirable to identify websites that have not yet been visited by the user, but that the user is likely to prefer.

In a one-class collaborative filtering problem relating to predicting items for which the user may express a preference, items for which the user has already expressed a preference (e.g., web pages actually clicked on) are assigned a particular value. For example, a logical "one" may correspond to preference by the user. The number of items for which the user has actually expressed a preference is likely to be sparse relative to the universe of available items. A matrix may be constructed to represent the universe of available items, with a logical "1" occupying all positions corresponding to items for which the user has actually expressed a preference.

When attempting to predict an item a particular user might prefer, there are essentially two known strategies for treating the items for which the user has not explicitly expressed a preference. In the first approach, which is based on a singular value decomposition (referred to as "SVD" herein), the items for which the user has not explicitly expressed a preference are assumed to have the same specific value for the weighted likelihood that the user will prefer them. For example, when predicting web pages a user may prefer based on sparse data regarding the web pages visited by the user, logical zeroes may be used for all web pages not visited by the user. This corresponds to an initial assumption that the user will not prefer those web pages. Subsequent iterations of predictive data may be calculated based on another matrix that represents a confidence in the prediction based on user preference data obtained from other users. Such a scenario is essentially premised on the notion that the degree to which a user is not likely to prefer any given item not chosen by the user may be based on the preference data from other users. For example, a prediction algorithm may assign a high confidence (for example, 0.95) to the assumption that the user will not prefer a particular item if many other users with similar demographic profiles have shown a high likelihood of not preferring that item. A low confidence (for example, 0.05) may be assigned to the assumption that the user will not prefer a particular item if many other users with similar demographic profiles have shown a high likelihood of preferring the item. A prediction may be made that a particular user will prefer an item for which no user preference data relative to the particular user is available by selecting an item having a sufficiently high preference by other users with some characteristics in common with the particular user. Moreover, if the weighted likelihood that the user will prefer an item based on data obtained from other users exceeds a certain preset level, the item may be presented to the user as a prediction via, for example, a web browser or the like.

The second approach to treating likelihood data that the user will prefer items for which the user has not explicitly expressed a preference involves treating the likelihood that a user will prefer each specific item for which no preference data relative to the particular user as missing rather than substituting an arbitrary value. An example of this approach is an alternating least squares methodology, which may be referred to as "ALS" herein. In such an approach, all non-missing values (for example, values corresponding to items the user is known to prefer) are all the same (for example, logical "ones"). In contrast, unobserved values are explicitly left blank. Regularization is needed to enforce any kind of generalization (to avoid a trivial solution that predicts the same value for every missing data instance).

One-class collaborative filtering problems may employ different weighting schemes based on whether a value is present or missing, and—optionally—based on the individual user and item under consideration to improve the predictive power of collaborative filtering models compared to (i) SVD methods that substitute zeros for all missing values, and (ii) ALS methods that are capable of ignoring missing values. In the case of the ALS approach in which there is only a single non-missing value (for example, a logical "one" to show that a user is known to prefer a particular item), the ALS method generalizes only due to a regularization of latent feature vectors. Only recently it has been suggested to use a weighted variant of ALS to balance the two extremes above. It can be used to weight the missing values after substituting logical zeros for them, which has been shown to yield better predictions in practice.

There are disadvantages to methods discussed above that require the substitution of default values (like logical "zeroes") for missing values. This seems necessary when substituted values are subsequently given weights corresponding to a confidence level in the arbitrary value likelihood value assigned to the item. This is problematic, because the practically most relevant case is that of a large but sparse matrix (for example, n users by m items and $\Theta(m+n)$ many non-missing values). Taking into account the number of latent variables as a constant, then substituting all missing values increases the runtime complexity from $O(n+m)$ to $\Omega(n*m)$. Because collaborative filtering relies on a large number of users and is usually performed on extremely sparse matrices, such an increase in runtime makes obtaining a solution practically intractable, especially for the most attractive data sets. In contrast, unweighted ALS methodologies can accommodate the missing values in a way that allows for runtimes in O(n+m), but as mentioned above, such methodologies lack the good generalization performance of its weighted counter-part.

One attempt to overcome the large increase in runtime complexity of an SVD-type methodology with weighting employs an ensemble technique that runs collaborative filtering multiple times. Each time, only a relatively small sub-sampled fraction of the negative examples (arbitrarily weighted likelihood values) is used. This sub-sampling approach makes the ensemble methodology feasible in practice from a computational cost standpoint, but at the cost of (i) decreasing the amount of negative examples considered during training, which reduces the expected quality of results, while (ii) still increasing the runtime considerably compared to the case of ALS without substituting any examples. This occurs because the costly collaborative filtering base algorithm is run multiple times, and even on a larger data set than in the sparse case.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
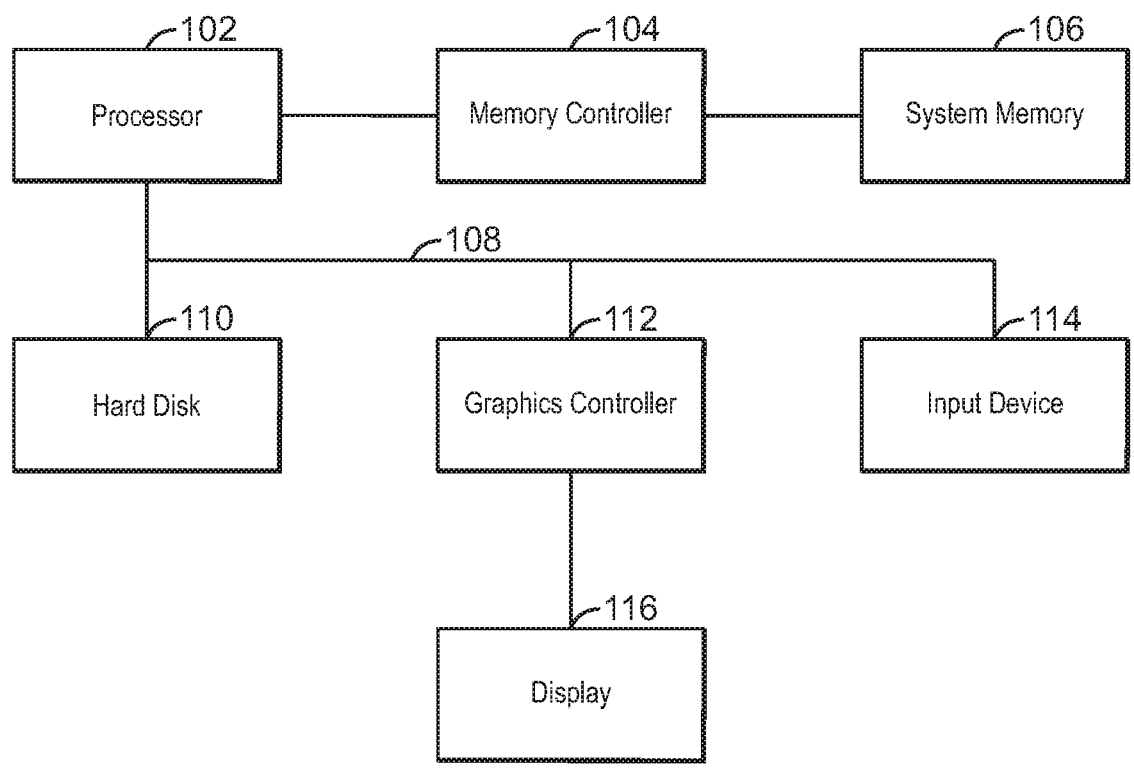
FIG. 1 is a block diagram of a computer system that is adapted to provide a recommendation based on a sparse pattern of data according to an exemplary embodiment of the present invention.

An exemplary embodiment of the present invention relates to an algorithm that solves a wide range of weighted ALS optimization problems to obtain a precise solution, but at the same asymptotic computational costs as a known ALS algorithm that does not provide for the substitution of missing weighted likelihood values that a user will prefer a given item. Moreover, an exemplary embodiment of the present invention may provide a relatively small absolute increase in runtimes compared to sparsity-preserving ALS. A prediction methodology in accordance with an exemplary embodiment of the present invention additionally applies to a much larger, more powerful family of weighting schemes that can all be incorporated in linear time.

An exemplary embodiment of the present invention addresses one-class collaborative filtering for the most useful case of very large and sparse data sets. Moreover, such a method is useful in cases having large data sets. A method according to an exemplary embodiment of the present invention scales linearly with the number of non-missing values without any loss in accuracy. A broader set of weighting schemes are supported.

As explained in detail below, an exemplary embodiment of the present invention relates to a system in which a large collection of data relating to many users and items is stored, for example, on a server. The data may be stored in one or more matrices. Clickstream data from many users is captured and the users are presented with information regarding an item that the each individual user is predicted to prefer, or which the user is likely to want additional information. The prediction about which items are of interest to particular users are determined according to a weighted ALS algorithm, which is computationally feasible because the prediction is based on or derived from a single computation of a likelihood that any user would be likely to prefer an individual item. Moreover, the prediction is made by augmenting the likelihood that any user would prefer an item with data that is known from a particular user's clickstream pattern.

By way of example, consider a low-rank user matrix X and a low-rank item matrix Y. Let the matrix R represents a sparse matrix that contains a uniform value for each item for which a particular user has explicitly expressed a preference. In a first scenario, the user for whom it is desired to predict a preferred item is part of an initial user base. This means that the user has a specific row in both the matrices R and X. Accordingly, the data for such a particular user has been used to make the initial determination of the likelihood that any user would prefer a particular item. Accordingly, the scores for the particular user may be used directly to identify items in the item matrix Y that the particular user is likely to prefer.

In a second scenario, the user for whom it is desired to predict a preferred item is not part of the initial user base. In this case, the prediction of a preferred item is based on the initial determination that any user would prefer a given item augmented by specific observed data about the user. The specific observed data may comprise a few observed clicks of the user or direct user input regarding, for example, products recently purchased by the user or interests of the user. For this scenario, two alternatives may be used to predict a preferred item. In the first alternative, the new user is given a new row in the matrix R and a recommendation of a preferred product is made just as if the user was part of the initial user base. In the second alternative, the prediction may be made by using the item matrix Y to compute a "best" existing row for the new user in the user matrix X. In other words, a prediction is made as to which row of the already existing user matrix X most closely corresponds to the known data about the user for whom the prediction is to be made. The prediction is then made as though the user has the same characteristics about the best-fitting known user from the user matrix X. This approach is computationally feasible because it does not depend on calculations that do not relate to the user for whom the prediction is to be made.

FIG. 1 is a block diagram of a computer system that is adapted to provide a recommendation based on a sparse pattern of data according to an exemplary embodiment of the present invention. The computer system is generally referred to by the reference number 100. Those of ordinary skill in the art will appreciate that the computer system 100 may comprise hardware elements including circuitry, software elements including computer code stored on a machine-readable medium or a combination of both hardware and software elements. Additionally, the functional blocks shown in FIG. 1 are but one example of functional blocks that may be implemented in an exemplary embodiment of the present invention. Those of ordinary skill in the art would readily be able to define specific functional blocks based on design considerations for a particular computer system.

A processor 102, such as a central processing unit or CPU, is adapted to control the overall operation of the computer system 100. The processor 102 is connected to a memory controller 104, which is adapted to read data to and write data from a system memory 106. The memory controller 104 may comprise memory that includes a non-volatile memory region and a volatile memory region.

The system memory 106 may be comprised of a plurality of memory modules, as will be appreciated by one of ordinary skill in the art. In addition, the system memory 106 may comprise non-volatile and volatile portions. A system basic input-output system (BIOS) may be stored in a non-volatile portion of the system memory 106. The system BIOS is adapted to control a start-up or boot process and to control the low-level operation of the computer system 100.

The processor 102 is connected to at least one system bus 108 to allow communication between the processor 102 and other system devices. The system bus may operate under a standard protocol such as a variation of the Peripheral Component Interconnect (PCI) bus or the like. In the exemplary embodiment shown in FIG. 1, the system bus 108 connects the processor 102 to a hard disk drive 110, a graphics controller 112 and at least one input device 114. The hard disk drive 110 provides non-volatile storage to data that is used by the computer system. The graphics controller 112 is in turn connected to a display device 116, which provides an image to a user based on activities performed by the computer system 100.

The computer system 100 may be programmed to predict a recommendation based on a sparse pattern of data, like the full clickstream of any individual user. Moreover, the recommendation could reflect a likelihood that a particular user will prefer an item for which no user preference data relative to the particular user is available. The prediction may be based on data obtained from users other than the particular user. The tangible, machine-readable storage media of the computer system 100, such as the system memory 106 or the hard disk 110, may store computer-executable code and/or instructions that cause the performance of a method of predicting a recommendation to a user based on a sparse pattern of data. The display device 116 may display a visual representation of the recommendation, the recommendation corresponding to a tangible item or process.

An exemplary embodiment of the present invention is adapted to solve optimization problems such that the same results are obtained with respect to known methods that are more computationally expensive. With respect to notation, upper case letters are used herein to denote matrices. A matrix with a single index, for example, $X_r$, denotes a row vector, with the index specifying the row of the matrix. Components of matrices are referred to using two indices. For example, $X_{r,c}$ denotes the element in row r and column c.

The general formal goal of SVD-style algorithms is to approximate a matrix of high rank in terms of another matrix of a low rank d.

Let the matrix R represents a sparse matrix that contains a uniform value for each item for which a particular user has explicitly expressed a preference. Let n represent the number of users, and m represent the number of items. It is of interest to find an approximation of matrix R that has a rank of d. Formally: Find a n×d matrix X and a m×d matrix Y such that $$\|R-XY^T\|^2 \to \min,$$

where $\|\cdot\|^2$ denotes the Frobenius norm. In one exemplary embodiment of the present invention, the matrix X provides a "condensed" representation of users, with each row of X corresponding to a row in R (a particular user). Each such row in X has only d dimensions, rather than as many dimensions as URLs or the like. Analogously, the matrix Y represents items in a condensed form. Each row represents a different item, like a specific product or URL, and has only d dimensions. When adding regularization to the objective above, the method has been reported and observed to generalize much better to hold-out data.

Variants of the ALS algorithm start from random matrices X and Y, and then alternate steps of optimizing the matrix X for fixed R and Y, and of optimizing Y for fixed R and X. Since both these steps are perfectly analogous, only the case of optimizing X for given R and Y is discussed herein for purposes of notational simplicity. Before going into technical depth, more notational conventions are described below.

For the following optimization steps, matrices and vectors are projected so that missing values in R will be ignored. Let $M := \{1, \ldots, m\}$ be the set of all row indices of Y, $M_r$ denote the set of indices of all non-missing values in row $R_r$. Let further $\pi_r$ denote a function that projects exactly those components of a vector into a lower dimensional space that are not missing in the vector $R_r^T$, that is, it projects exactly those components with index in $M_r$. In other words, $\pi_r(R_r^T)$ yields a longest lower dimensional vector which is a projection of $R_r^T$.

Correspondingly, let $\pi_r(Y)$ denote the matrix that results from projecting each column vector using $\pi_r$. If no values are missing in $R_r$, then $$\pi_r(Y)^T \pi_r(R_r^T) = Y^T R_r^T,$$

otherwise the multiplication after projection (left hand side) simply ignores all products containing a missing value.

The rules apply for updating individual rows $X_r$ of matrix X now. The basic unregularized and unweighted ALS algorithm uses the following updates:

$$X_r := (\pi_r(Y)^T \pi_r(Y))^{-1} \pi_r(Y)^T \pi_r(R_r^T)$$

ALS update rule with regularization:

$$X_r := (\pi_r(Y)^T \pi_r(Y) + \lambda I)^{-1} \pi_r(Y)^T \pi_r(R_r^T),$$

where I denotes the identity matrix.

ALS update rule with regularization, substitution of zeros for missing values, and component-wise weighted loss:

$$X_r := \left( Y^T W_r Y + \lambda \left( \sum_{i \in M} W_{r,i} \right) I \right)^{-1} Y^T W_r R_r^T \qquad (1)$$

The last case is of interest because it is the only case in which computational costs scale up at least linearly in the size of the matrix per iteration, that is $\Omega(n*m)$. In the previous cases, each iteration is linear in the maximum of (i) number of non-missing values, and (ii) number of rows, and (iii) number of columns, whichever grows fastest. Again, a constant number of latent variables is assumed, since the rank of the approximation simply adds a common factor to all the considered optimization problems.

The following example relates to the methodology of using uniform weighting for missing observations (for example, elements in a sparse matrix that correspond to items for which no user preference data is available relative to a particular user). One algorithmic challenge in such a case is to efficiently solve the optimization problem depicted in equation (1) above. The example set forth below relates to a weighing scheme in which a likelihood that a particular user will prefer (or not prefer) a particular item is determined based on data obtained from other users. A fixed weight of S is assigned to all missing values (items with no preference data relative to the particular user) and a weight of one ("1") is assigned to each non-missing value (items for which the particular user has expressed a preference).

For recomputing matrix X to predict an item for which the particular user is likely to have a preference, an exemplary embodiment of the present invention performs only a single update for the complete matrix of X each time Y has changed. In particular, the following equation is computed:

$$A' := \delta \cdot (Y^T Y)$$

And then for each row $X_r$ the following equations are computed (for simplicity omitting arguments of the matrices):

$$B' := (1-\delta) \cdot (\pi_r(Y)^T \pi_r(Y))$$

$$C' := \lambda(\delta m + (1-\delta)|M_r|) \cdot I$$

$$q_r := \pi_r(Y)^T 1$$

where the vector 1 denotes the vector that has 1 as the value of each component. Finally, $X_r$ is recomputed as:

$$X_r^T = (A' + B' + C')^{-1} q_r$$

To show that these computations are equivalent to the update defined by equation (1), an initial objective function may be broken down into a linear equation system using matrices A, B, and C. For notational simplicity, the arguments of these matrices are again omitted. Matrix A represents the portion of the problem that does not depend on the particular row of X for which we are solving. Moreover, matrix A represents any given row of matrix X representing no items for which explicit user preference data is available relative to a particular user. This means that matrix A can be computed a single time for each user and substituted for each row of the recomputed matrix X having no values representing items for which the particular user has explicitly expressed a preference. If the original matrix X is representative of a sparse data set, significant computational cost savings may be obtained by calculating the matrix A a single time and reusing the results. The matrix B represents the specific rows of X that include user preference data expressly provided by the particular user. Moreover, the matrix B works with projections of $R_r$ and Y, so that it scales linearly with the number of non-missing values (for example, values corresponding to items for which the particular user has explicitly expressed a preference). Matrix C represents the regularization of X.

First, the objective function underlying equation (1) is restated, as follows:

$$\mathcal{L}(X, Y) = \sum_{r=1}^{n} \mathcal{L}(X_r, Y) + \underbrace{X_r^T X_r \cdot \lambda \left( \sum_{i \in M} W_{r,i} \right)}_{=:C}$$

Focusing on the row-wise loss term first results in:

$$\mathcal{L}(X_r, Y) = \sum_{i \in M} W_{r,i} \cdot (X_r^T Y_i - R_{r,i})^2$$

-continued $$= \sum_{i \in M \setminus M_r} \delta(X_r^T Y_i - 0)^2 + \sum_{i \in M_r} 1 \cdot (X_r^T Y_i - 1)^2$$

$$= \underbrace{\sum_{i \in M_r} \delta(X_r^T Y_i)^2}_{=:A} - \underbrace{\sum_{i \in M_r} \delta(X_r^T Y_i)^2 + \sum_{i \in M_r} \left( (X_r^T Y_i)^2 - 2(X_r^T Y_i) + 1 \right)}_{=:B}$$

Now, the partial derivative of the term $L(X_r, Y) = A + B$ with respect to $X_{r,c}$ is considered:

$$\frac{\partial A}{\partial X_{r,c}} = \sum_{i \in M} 2 Y_{i,c} \delta(X_r^T Y_i)$$

$$\frac{\partial B}{\partial X_{r,c}} = \sum_{i \in M_r} 2 Y_{i,c} ((1-\delta)(X_r^T Y_i) - 1)$$

The regularization term for the uniform weighting is $$C = X_r^T X_r \cdot \lambda \left( \sum_{i \in M} W_{r,i} \right) = X_r^T X_r \cdot \lambda(\delta(m - |M_r|) + 1 \cdot |M_r|)$$

It has the partial derivative:

$$\frac{\partial C}{\partial X_{r,c}} = X_{r,c} \cdot 2(\delta m + (1-\delta)|M_r|)$$

Now, the partial derivative of the full objective function is rearranged, as follows:

$$\frac{\partial \mathcal{L}(X, Y)}{\partial X_{r,c}} = 2\delta \sum_{i \in M} \sum_{d} X_{r,d} Y_{i,d} Y_{i,c} +$$

$$2(1-\delta) \sum_{i \in M} \sum_{d} X_{r,d} Y_{i,d} Y_{i,c} -$$

$$2 \sum_{i \in M_r} Y_{i,c} + 2 X_{r,c} \lambda(\delta m + (1-\delta)|M_r|)$$

$$= 2 \sum_{d} X_{r,d} \left( \left( \delta \sum_{i \in M} Y_{i,d} Y_{i,c} \right) + (1-\delta) \sum_{i \in M_r} Y_{i,c} Y_{i,d} \right) -$$

$$2 \sum_{i \in M_r} Y_{i,c} + 2 X_{r,c} \lambda(\delta m + (1-\delta)|M_r|)$$

Setting all the partial derivatives to zero gives:

$$\forall c : 2\delta \sum_{i \in M} \sum_{d} X_{r,d} Y_{i,d} Y_{i,c} + 2(1-\delta) \sum_{i:M_r} \sum_{d} X_{r,d} Y_{i,d} Y_{i,c} -$$

$$2 \sum_{i \in M_r} Y_{i,c} + 2 X_{r,c} \lambda(\delta m + (1-\delta)|M_r|) =$$

$$0 \Leftrightarrow \forall c : \sum_{d} X_{r,d} \left( \underbrace{\left( \delta \sum_{i \in M} Y_{i,d} Y_{i,c} \right)}_{\doteq A'} + \underbrace{(1-\delta) \sum_{i \in M_r} Y_{i,c} Y_{i,d}}_{\doteq B'} \right) +$$

$$\underbrace{X_{r,c} \lambda(\delta m + (1-\delta)|M_r| I)}_{\doteq C'} =$$

-continued $$\underbrace{\sum_{i \in M_r} Y_{i,c}}_{\hat{=} q_r} \Leftrightarrow (A' + B' + C')X_r^T = q_r,$$

with $$A' := \delta \cdot (Y^T Y)$$

$$B' := (1 - \delta) \cdot (\pi_r(Y)^T \pi_r(Y))$$

$$C' := \lambda(\delta m + (1 - \delta)|M_r|) \cdot I$$

$$q_r := \pi_r(Y)^T 1$$

Those of ordinary skill in the art will appreciate that, although Y might be very large, matrices A' through C' are quadratic matrices of size d×d, where d is the rank of the approximation, which is usually on the order of 10 to 50.

As set forth above, matrix A' is unchanged for all subsequent recomputations of vectors $X_r$. Thus, matrix A' can be pre-computed just once per recomputation of X. The costs for this step are in $O(m \cdot d^2)$.

In contrast, matrix B' depends on the specific row $R_r$. As with the sparse ALS case, it is sufficient to work on projections $\pi_r(Y)$ of Y on the non-missing values. As a consequence, the number of summations per full recomputation of X is linear in the number $$\mathcal{R} := \sum_{r=1}^{n} |M_r|$$

of non-missing values. This step of recomputing X is hence in $O(R \cdot d^2)$.

The computation of matrix C' depends only on the constant parameters λ and δ, and on the number of missing values on the current row, which is constant throughout the algorithm and can trivially be computed from the number of non-missing values, for example, during the initialization of data structures. This step is in O(1), while the initialization before the first iteration can be done in time O(R) plus $O(m \cdot d^2)$ for initializing Y randomly. Finally, the computation of $q_r$ simplifies to multiplying the projection of Y with the vector 1.

The following discussion relates to low-rank weight matrices. In particular, the discussion relates to how to extend the previous technique to support more complex ways of weighting substituted missing values. It may be assumed that the weight matrix over the missing values can be expressed (or well approximated) by a low rank approximation:

$$W = UV^T$$

The objective function may be decomposed, as set forth above. In particular, matrix multiplications that are expensive but independent of the target row $X_r$ may be factored out. Again, the goal is to perform those expensive operations only once per recomputation of matrix X or Y, respectively, so that the overall costs remain linear in the number of non-missing values. In the following illustration, the matrices A', B', C and vector $q_r$ are used as before. Again, the computation scheme will compute A' only once each time Y changes, and only B', C' and $q_r$ for each row $X_r$.

The general objective function is used as a starting point. The computation for A' through C' and $q_r$ will change as defined herein.

$$\mathcal{L}(X, Y) = \sum_r \left( \mathcal{L}(X_r, Y) + \lambda \underbrace{\sum_{i \in M} W_{r,j}}_{=:C} \right)$$

to first decompose the row-wise loss term:

$$\mathcal{L}(X_r, Y) = \sum_{i \in M} W_{r,i} \cdot (X_r^T y_i - R_{i,j})^2$$

$$= \sum_{i \in M \setminus M_r} U_r V_i^T (X_r^T y_i)^2 + \sum_{i \in M_r} (X_r^T y_i - R_{r,i})^2$$

$$= \underbrace{\sum_{i \in M} U_r V_i^T (X_r^T y_i)^2}_{=:A} +$$

$$\underbrace{\sum_{i \in M_r} \left( (X_r^T y_i - R_{r,i})^2 - U_r V_i^T (X_r^T y_i)^2 \right)}_{=:B}$$

$$\frac{\partial A}{\partial X_{r,c}} = 2 \sum_{i \in M} \left( Y_{i,c} \sum_D (U_{r,D} \cdot V_{i,D}) \left( \sum_d X_{r,d} \cdot Y_{i,d} \right) \right)$$

$$= \sum_{i \in M} \left( Y_{i,c} \sum_D \sum_d U_{r,D} \cdot V_{i,D} \cdot X_{r,d} \cdot Y_{i,d} \right)$$

$$= \sum_d \sum_D \sum_{i \in M} (Y_{i,c} \cdot U_{r,D} \cdot V_{i,D} \cdot X_{r,d} \cdot Y_{i,d})$$

$$= \sum_d X_{r,d} \sum_D U_{r,D} \sum_{i \in M} (Y_{i,c} \cdot V_{i,D} \cdot Y_{i,d})$$

Based on the inner sum, |D| many two-dimensional matrices are defined, as follows: $(a_{c,d}^{(1)}), \ldots, (a_{c,d}^{(|D|)})$:

$$a_{c,d}^{(D)} := \sum_{i \in M} Y_{i,c} \cdot Y_{i,d} \cdot V_{i,D}$$

Each of these matrices does not depend on the data of any particular user, but can be computed before-hand. For each user-specific weight vector u, a single 2-dimensional matrix A' can then be compute by weighting the |D| matrices accordingly:

$$A'_{c,d} := \sum_D U_{r,D} \cdot a_{c,d}^{(D)}.$$

Intuitively, this matrix represents the user-specific linear equation system A'x=0 which corresponds to optimizing for an empty row $R_r$ (all values are missing) without regularization. Because of the linearity of the overall objective function, all we have to do is to find the corresponding matrices B' and C'. This will allow the restatement of the optimization problem in closed form in a way that can be solved in linear time.

The partial derivative of B for the one-class case ($R_{r,i}=1$ if $i \in M_r$) and if all non-missing values having a weight of $W_{r,i}=1$:

$$\frac{\partial B}{\partial X_{r,c}} = \left[ \partial \sum_{i \in M_r} \left( (X_r^T y_i - 1)^2 - U_r V_i^T (X_r^T y_i)^2 \right) \right] / \partial X_{r,c}$$

-continued $$= \sum_{i \in M_r} (2Y_{i,c} X_r^T y_i - 2Y_{i,c} - 2Y_{i,c} U_r V_i^T X_r^T y_i)$$

$$= 2 \sum_d X_{r,d} \sum_{i \in M_r} \left( Y_{i,c} Y_{i,d} - Y_{i,c} Y_{i,d} \sum_D U_{r,D} V_{i,D} \right) - 2 \sum_{i \in M_r} Y_{i,c}$$

$$= \sum_d X_{r,d} 2 \left( \underbrace{\left( \sum_{i \in M_r} Y_{i,c} Y_{i,d} \right)}_{\doteq \hat{B}'} - \underbrace{\left( \sum_D U_{r,D} \overbrace{\sum_{i \in M_r} Y_{i,c} Y_{i,d} V_{i,D}}^{\doteq \tilde{b}_{c,d}^{(D)}} \right)}_{\doteq \tilde{B}'} \right) -$$

$$\underbrace{2 \sum_{i \in M_r} Y_{i,c}}_{\doteq q_r}$$

Decomposition into matrices (while anticipating that the factor of 2 will cancel out later):

$$B' := \hat{B}' - \tilde{B}', \text{ where}$$

$$\hat{B}' := \pi_r(Y)^T \pi_r(Y)$$

$$\tilde{B}'_{c,d} := \sum_D U_{r,D} \cdot \tilde{b}_{c,d}^{(D)}$$

$$\tilde{b}_{c,d}^{(D)} := \sum_{i \in M_r} Y_{i,c} Y_{i,d} V_{i,D}$$

$q_r := \pi_r(Y)^T 1$ will also be required. The following equations illustrate how the matrix for regularization may be computed:

$$c = \sum_d \left( (X_{r,d})^2 \lambda \sum_{i \in M} W_{r,i} \right)$$

$$= \sum_d (X_{r,d})^2 \lambda \left( \sum_{i \in M \setminus M_r} U_r V_i^T + \sum_{i \in M_r} 1 \right)$$

Clearly, a trivial multiplication of U and V leads to non-linear costs. Hence, the terms may be reorganized, as follows:

$$\frac{\partial C}{\partial X_{r,c}} = 2 X_{r,c} \lambda \left( \left( \sum_i U_r V_i^T \right) - \left( \sum_{i \in M_r} U_r V_i^T \right) + |M_r| \right)$$

$$= X_{r,c} 2 \lambda \left[ |M_r| + \sum_D U_{r,D} \left( \left( \sum_{i \in M} V_{i,D} \right) - \left( \sum_{i \in M_r} V_{i,D} \right) \right) \right]$$

The corresponding matrix can be computed as $$C' := 2\lambda (\hat{C}' + |M_r|) \cdot I, \text{ where}$$

$$\hat{C}' := U_r (V_{sum} - \pi_r(V)^T \pi_r(1))$$

$$V_{sum} := V^T 1$$

Those of ordinary skill in the art will appreciate that the overall optimization problem is still convex. Setting all derivatives $\partial L(X_r, Y)/\partial X_{r,c}$ to zero yields $$\forall c: \partial L(X_r, Y)/\partial X_{r,c} = 0$$

$$\Leftrightarrow \forall c: \left( \frac{\partial A}{\partial X_{r,c}} + \frac{\partial B}{\partial X_{r,c}} + \frac{\partial C}{\partial X_{r,c}} \right) = 0$$

$$\Leftrightarrow (A' + B'_r + C') X_r^T = q_r$$

$$\Leftrightarrow X_r^T = (A' + B' + C')^{-1} q_r$$

This facilitates a solution for many known weighting schemes as special cases with a rank of 1.

If the rank of the target approximation is d, the rank of the weight matrix is D, and the number of non-missing values R is in $\Theta(n+m)$, then it can be seen that the overall runtime complexity of an update of X or Y is in $O(D \cdot d^2 \cdot R)$. ALS tends to converge quickly, so in practice, 20 to 30 iterations are usually sufficient to yield excellent results, even for large data sets.

3.4 Experimental Confirmation

Figure 2:
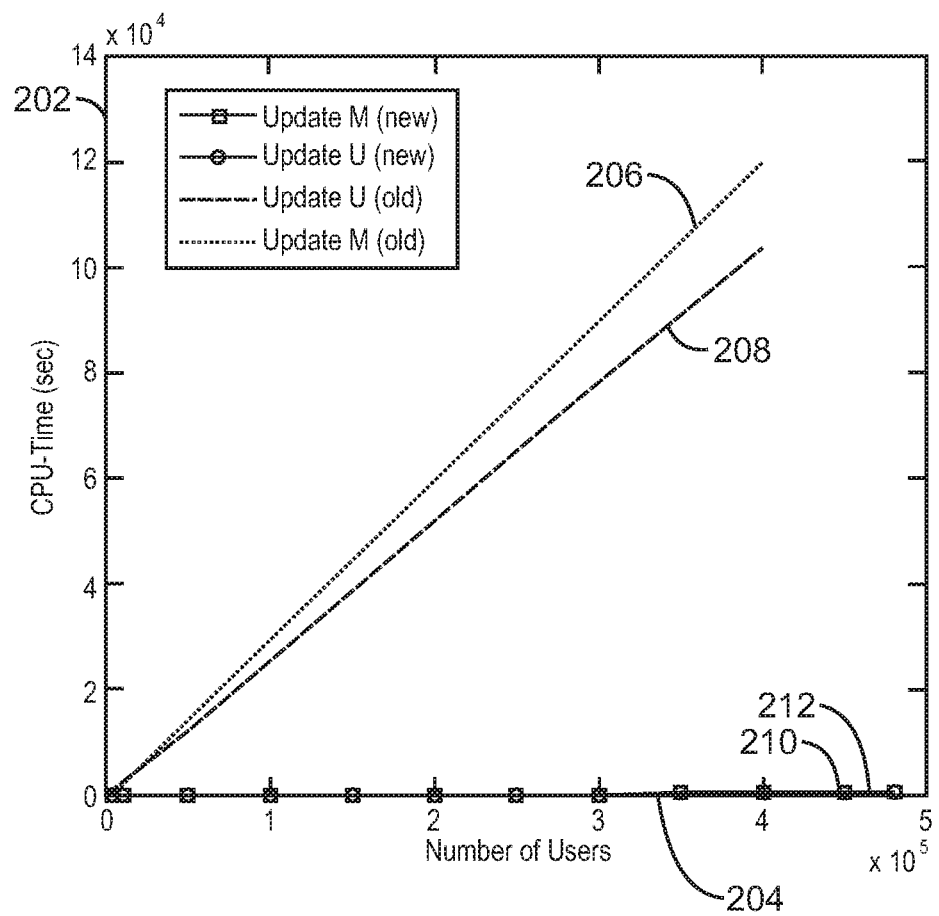
FIG. 2 is a graph that is useful in explaining cost savings that may be obtained using an exemplary embodiment of the present invention.
Figure 3:
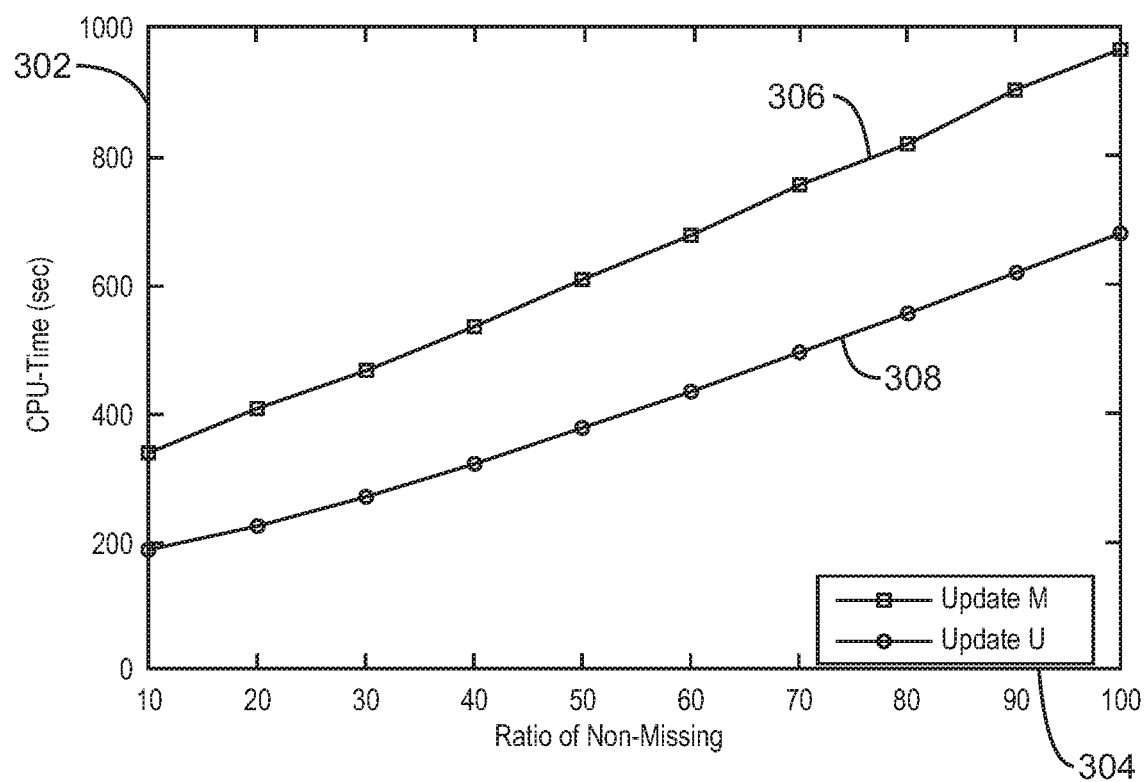
FIG. 3 is another graph that is useful in explaining cost savings that may be obtained using an exemplary embodiment of the present invention.
Figure 4:
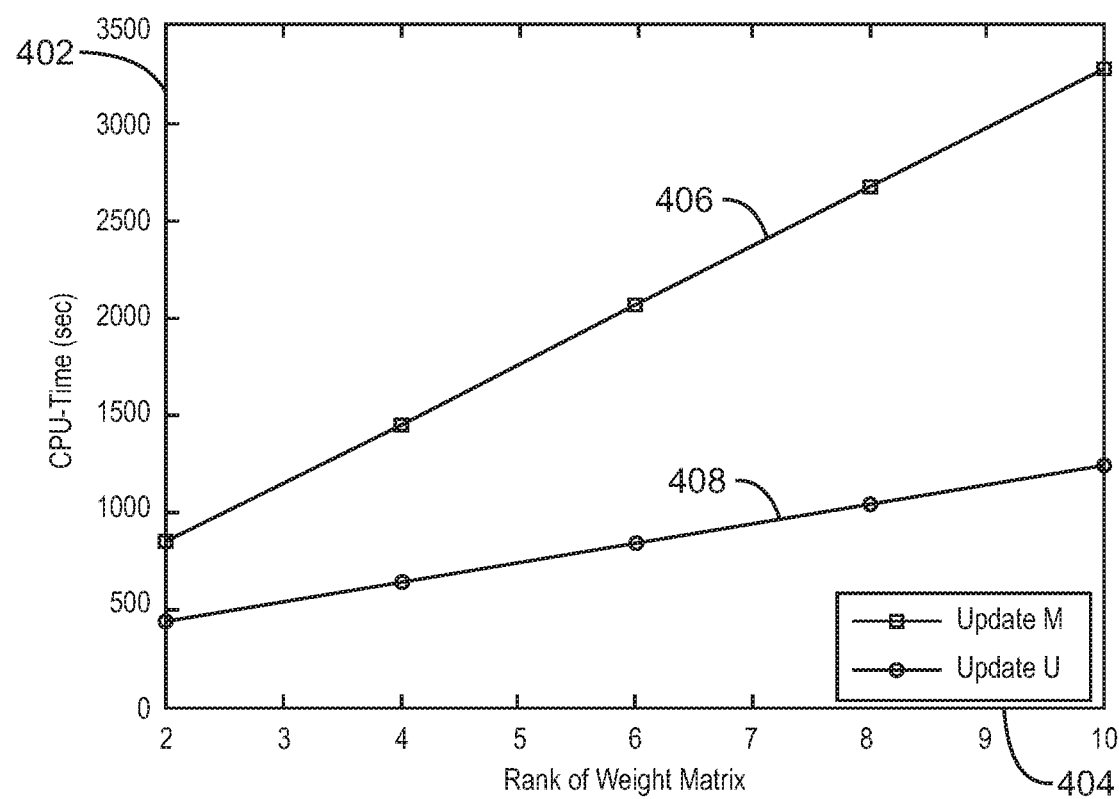
FIG. 4 is yet another graph that is useful in explaining cost savings that may be obtained using an exemplary embodiment of the present invention.

An exemplary embodiment of the present invention has been applied to a known data set used for the KDD Cup 2007 data (also known as the Netflix Prize (see www.netflix-prize.com for more information). The KDD Cup 2007 data comprises a sparse matrix of size roughly 20,000×500,000. An exemplary embodiment of the present invention has been implemented in commercially available versions of Matlab and Java to confirm that it gives acceptable results relative to previously known algorithms that are less scalable. This permits a study of how a method according to an exemplary embodiment of the present invention scales up as a function of different variables. The data represented in FIGS. 2-4 represent results obtained using the Matlab code on the publicly available binary data for the KDD Cup 2007 available from the website www.netflixprize.com. The KDD Cup 2007 data represents patterns with which users (U) rent movies (M). As used herein, the expression "updating U" refers to an update of the user matrix U and the expression "updating M" refers to an update of the item matrix M. In the KDD Cup 2007 data set, the user data matrix U corresponds to the matrix X in the examples shown above. The movie data matrix M corresponds to the matrix Y in the examples shown above. The sparsity of the data in the KDD Cup 2007 data set is about 1%. The data shown in FIGS. 2-3 represents only the case of a weight matrix of rank 1. As shown in FIGS. 2-4, an exemplary embodiment of the present invention provides significant savings in terms of CPU cost relative to known prediction methodologies.

FIG. 2 is a graph that is useful in explaining cost savings that may be obtained using an exemplary embodiment of the present invention. The graph is generally referred to by the reference number 200. The graph 200 includes a y-axis 202 that represents central processing unit (CPU) execution time in seconds and an x-axis 204 that represents a number of users in the KDD Cup 2007 data set. The traces in FIG. 2 represent data for a fixed number of items and a varying number of users. A first trace 206 and a second trace 208 represent a known method of updating matrices M and U respectively for the purpose of predicting a user preference. As can be seen, the known method incurs significant cost in CPU time as the number of users grows. This result occurs because the known method performs a full explicit substitution and weighting for each matrix update. A third trace 210 and a fourth trace 212 represent a method of updating matrices M and U respectively in accordance with an exemplary embodiment of the present invention for the purpose of predicting a user preference. As shown in FIG. 2, a method of predicting a user in accordance with an exemplary embodiment of the present invention does not significantly increase CPU processing time as the number of users increases.

FIG. 3 is another graph that is useful in explaining cost savings that may be obtained using an exemplary embodiment of the present invention. The graph is generally referred to by the reference number 300. The graph 300 includes a y-axis 302 that represents central processing unit (CPU) execution time in seconds and an x-axis 304 that represents a ratio of non-missing items in the KDD Cup 2007 data set. To produce the traces shown in FIG. 3 the item matrix M was fixed but data for items for which a user had expressed a preference (positive data sparsely represented in the data set) were removed at random. This allows an increase in the sparsity of the data from 1% positives (shown at the right side of the graph 300) to 0.1% (shown at the left side of the graph 300). A first trace 306 represents the performance of a method according to an exemplary embodiment of the present invention when updating the item matrix M and a second trace 308 represents the performance of a method according to an exemplary embodiment of the present invention when updating the user matrix U. The traces 306 and 308 confirm the linearity of a method in accordance with an exemplary embodiment of the present invention in the number of non-missing values.

FIG. 4 is yet another graph that is useful in explaining cost savings that may be obtained using an exemplary embodiment of the present invention. The graph is generally referred to by the reference number 400. The graph 400 includes a y-axis 402 that represents central processing unit (CPU) execution time in seconds and an x-axis 304 that represents the rank of the weight matrix used in combination with the KDD Cup 2007 data set. A first trace 406 represents the performance of a method according to an exemplary embodiment of the present invention when updating the item matrix M and a second trace 408 represents the performance of a method according to an exemplary embodiment of the present invention when updating the user matrix U. The traces 406 and 408 confirm that increasing the rank of the weight matrix affects the computational costs in an approximately linear manner.

Figure 5:
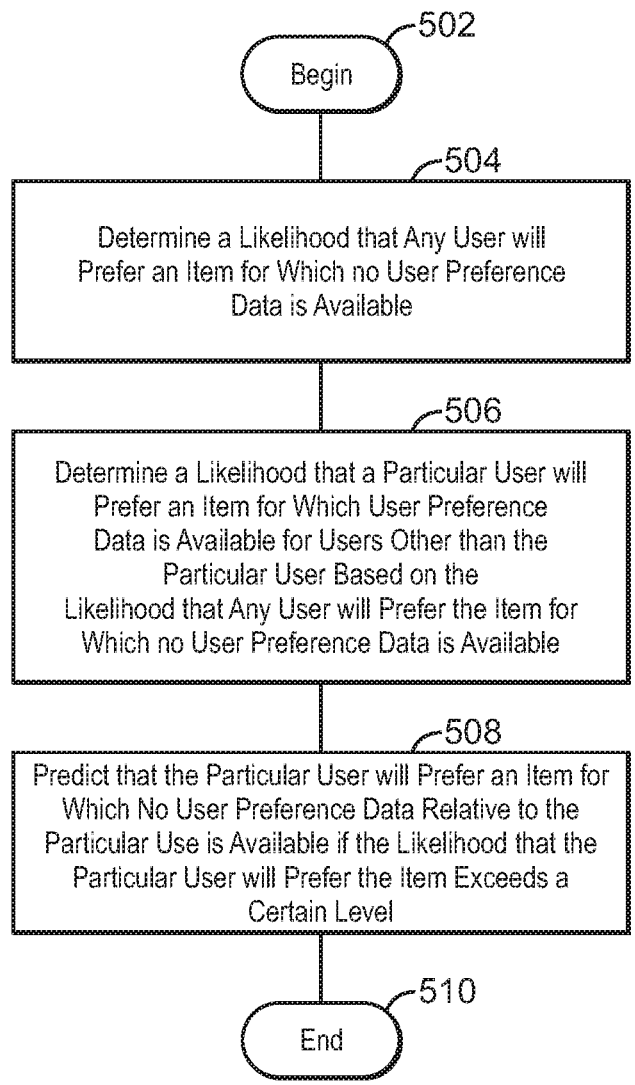
FIG. 5 is a process flow diagram showing a method of providing a recommendation based on a sparse pattern of data according to an exemplary embodiment of the present invention.

FIG. 5 is a process flow diagram showing a method of providing a recommendation based on a sparse pattern of data according to an exemplary embodiment of the present invention. The method is generally referred to by the reference number 500. In preparation for the method 500, a weighting strategy is determined for unobserved items. The weighting strategy may vary depending on design considerations for a particular purpose. Examples of weighting strategies include default weighting (as used in the example above), popularity-based scores user-based weighting or the like.

At block 502, the method begins. At block 504, a likelihood is determined that any user will prefer an item for which no user preference data is available. In an exemplary embodiment of the present invention, the determination made at block 504 may be reused in subsequent iterations of updating weighting matrices for purposes of generating a prediction that a particular user will prefer an item. In a data set in which user preference data for the particular user is sparse, the reuse of the determination made at block 504 results in significant savings in CPU processing time of the successive data because the determination made at block 504 applies to the vast majority of data in the data set.

A likelihood is then determined that a particular user will prefer an item for which user preference data is available for users other than the particular user based on the likelihood that any user will prefer the item for which no user preference data is available, as shown at block 506. This determination may be made, for example, by comparing demographic or other data about the particular user to other users for which preference data may be known. The determination made at block 506 is based on the determination made at block 504 to exploit the fact that the determination made at block 504 encompasses a very large proportion of a sparse data set: that part of the data set for which no user preference data is known relative to the particular user.

At block 508, a prediction is made that the particular user will prefer at least one item for which no user preference data relative to the particular user is available if the likelihood that the particular user will prefer the item exceeds a certain level. This prediction may be made by selecting an item having a likelihood that exceeds a preset level that the particular user will prefer the item for which no user preference data is known relative to the particular user.

Figure 6:
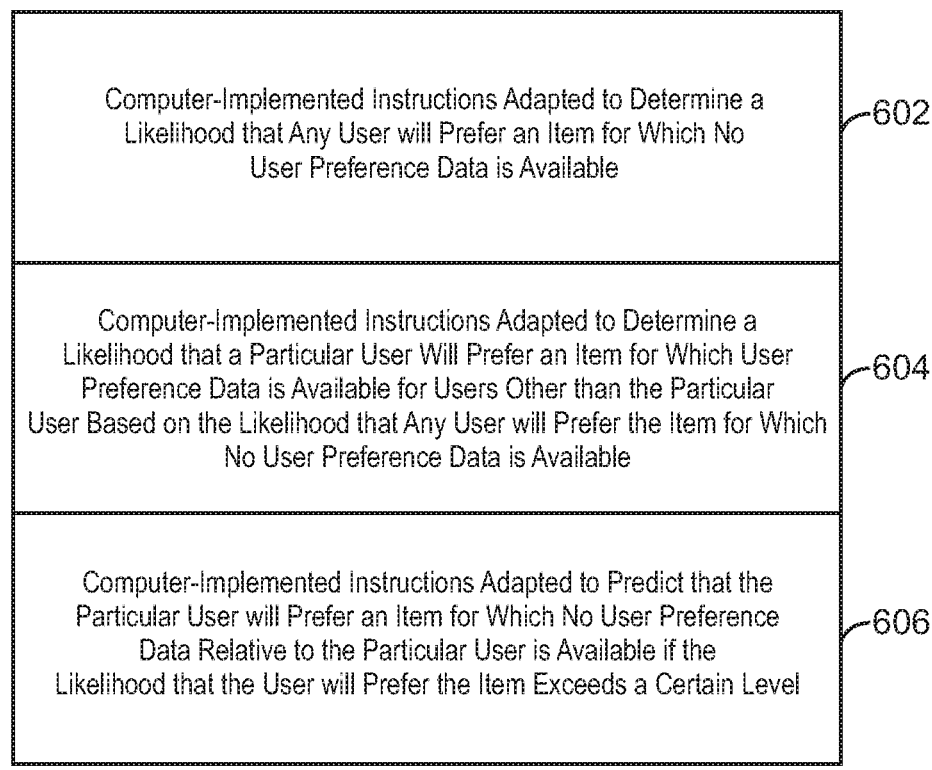
FIG. 6 is a block diagram showing a tangible, machine-readable medium that stores code adapted to provide a recommendation based on a sparse pattern of data according to an exemplary embodiment of the present invention.

FIG. 6 is a block diagram showing a tangible, machine-readable medium that stores code adapted to provide a recommendation based on a sparse pattern of data according to an exemplary embodiment of the present invention. The tangible, machine-readable medium is generally referred to by the reference number 600. The tangible, machine-readable medium 600 may correspond to any typical storage device that stores computer-implemented instructions, such as programming code or the like. Moreover, the tangible, machine-readable medium 600 may comprise the system memory 106 and/or the hard disk 110 shown in FIG. 1.

A first region 602 of the tangible, machine-readable medium 600 stores computer-implemented instructions adapted to determine a likelihood that any user will prefer an item for which no user preference data is available. A second region 604 of the tangible, machine-readable medium 600 stores computer-implemented instructions adapted to determine a likelihood that a particular user will prefer an item for which user preference data is available for users other than the particular user based on the likelihood that any user will prefer the item for which no user preference data is available. Finally, a third region 606 of the tangible, machine-readable medium 600 stores computer-implemented instructions adapted to predict that the particular user will prefer at least one item for which no user preference data relative to the particular user is available if the likelihood that the particular user will prefer the item exceeds a certain level.

An exemplary embodiment of the present invention allows the substitution and weighting of all missing values for ALS at asymptotically none and effectively just a small additional cost. In addition, an exemplary embodiment of the present invention allows the use of complex weighting schemes. If the weight matrix can be described exactly in terms of a low rank approximation, then the method gives exactly the same result as explicitly substituting the values and using weights in regular ALS. Otherwise only small mistakes will be made using an approximation of the weight matrix. From a larger set of candidate methods, the weighted ALS strategy is believed to produce the best collaborative filtering results in the one-class setting.

What is claimed is:
1. A computer-implemented method comprising:
   generating a first matrix from clickstream data, wherein:
      the first matrix indicates, for each user of a plurality of users, which website of a plurality of websites the each user of the plurality of users has visited;
      the first matrix comprises a plurality of rows and a plurality of columns;

the plurality of rows corresponds to the plurality of users such that each row of the plurality of rows corresponds to a different user of the plurality of users;
the plurality of columns corresponds to the plurality of websites such that each column of the plurality of columns corresponds to a different website of the plurality of websites; and
the first matrix contains a plurality of values organized in the plurality of rows and the plurality of columns such that each value of the plurality of values is associated with a corresponding user of the plurality of users and is associated with a corresponding website of the plurality of websites and the each value of the plurality of values represents whether the corresponding user visited the corresponding website;
updating a particular row of the plurality of rows for a particular user from a second matrix representing first websites of the plurality of websites which the particular user has not visited and from a third matrix representing second websites of the plurality of websites that the particular user has visited;
based on the first matrix after the updating, predicting a certain web site that the particular user has not visited; and
providing data to display the certain website on a display device.

2. The method of claim 1, wherein the updating further comprises updating the particular row from a fourth matrix representing a regularization of the first matrix.

3. The method of claim 1, wherein the predicting comprises predicting the certain website as a given first website of the first websites and predicting that the given first website is preferred by the particular user.

4. The method of claim 1, wherein each value of the plurality of values has a first weight if the associated corresponding user of the plurality of users has visited the associated corresponding website of the plurality of websites, and a second weight if the associated corresponding user has not visited the associated corresponding website of the plurality of websites.

5. The method of claim 1, wherein the clickstream data comprises a sparse pattern of data.

6. The method of claim 1, wherein the plurality of users comprises the particular user.

7. The method of claim 1, further comprising accessing the clickstream data from a server.

8. A non-transitory computer-readable data storage medium storing instructions that, when executed by a computing device, cause the computing device to:
generate a first matrix from clickstream data, wherein:
the first matrix indicates, for each user of a plurality of users, which website of a plurality of websites the each user of the plurality of users has visited;
the first matrix comprises a plurality of rows and a plurality of columns;
the plurality of rows corresponds to the plurality of users such that each row of the plurality of rows corresponds to a different user of the plurality of users;
the plurality of columns corresponds to the plurality of websites such that each column of the plurality of columns corresponds to a different website of the plurality of websites; and
the first matrix contains a plurality of values organized in the plurality of rows and the plurality of columns such that each value of the plurality of values is associated with a corresponding user of the plurality of users and is associated with a corresponding website of the plurality of websites and the each value of the plurality of values represents whether the corresponding user visited the corresponding website;
update a particular row of the plurality of rows for a particular user from a second matrix representing first websites of the plurality of websites which the particular user has not visited and from a third matrix representing second websites of the plurality of websites that the particular user has visited; and
based on the first matrix after the updating, predict a certain website that the particular user has not visited; and
provide data to display the certain website on a display device.

9. The non-transitory computer-readable data storage medium of claim 8, wherein the instructions, when executed by the computing device, further cause the computing device to update the-particular row from a fourth matrix representing a regularization of the first matrix.

10. The non-transitory computer-readable data storage medium of claim 8, wherein the instructions, when executed by the computing device, further cause the computing device to predict the certain website as a given first website of the first websites of the plurality of websites and predict that the given first website is preferred by the particular user.

11. The non-transitory computer-readable data storage medium of claim 8, wherein each value of the plurality of values has a first weight if the associated corresponding user of the plurality of values has visited the associated corresponding website of the plurality of websites, and a second weight if the associated corresponding user has not visited the associated corresponding website of the pluraity of websites.

12. The non-transitory computer-readable data storage medium of claim 8, wherein the clickstream data comprises a sparse pattern of data.

13. The non-transitory computer-readable data storage medium of claim 8, wherein the plurality of users comprises the particular user.

14. The non-transitory computer-readable data storage medium of claim 8, further comprising accessing the clickstream data from a server.

15. A computing system comprising:
a processor; and
a memory device storing instructions that, when executed by the processor, cause the processor to:
generate a first matrix from clickstream data, wherein:
the first matrix indicates, for each user of a plurality of users, which website of a plurality of websites the each user of the plurality of users has visited;
the first matrix comprises a plurality of rows and a plurality of columns;
the plurality of rows corresponds to the plurality of users such that each row of the plurality of rows corresponds to a different user of the plurality of users;
the plurality of columns corresponds to the plurality of websites such that each column of the plurality of columns corresponds to a different website of the plurality of websites; and
the first matrix contains a plurality of values organized in the plurality of rows and the plurality of columns such that each value of the plurality of values is associated with a corresponding user of the plurality of users and is associated with a corresponding website of the plurality of websites and the each value of the plurality of values represents whether the corresponding user visited the corresponding website;

update a particular row of the plurality of rows for a particular user from a second matrix representing first websites of the plurality of websites which the particular user has not visited and from a third matrix representing second websites of the plurality of websites that the particular user has visited; and based on the first matrix after the updating, predict a certain website that the particular user has not visited; and provide data to display the certain website on a display device.

16. The computing system of claim 15, wherein the instructions, when executed by the processor, further cause the processor to update the particular row from a fourth matrix representing a regularization of the first matrix.

17. The computing system of claim 15, wherein the instructions, when executed by the processor, further cause the processor to predict the certain website as a given first website of the first websites of the plurality of websites and predict that the given first website is preferred by the particular user.

18. The computing system of claim 15, wherein each value of the plurality of values has a first weight if the associated corresponding user of the plurality of users has visited the associated corresponding website of the plurality of websites, and a second weight if the associated corresponding user has not visited the associated corresponding website of the plurality of websites.

19. The computing system of claim 15, wherein the clickstream data comprises a sparse pattern of data.

20. The computing system of claim 15, wherein the plurality of users comprises the particular user.

* * * * *